(12) United States Patent
Singer

(10) Patent No.: US 9,392,814 B2
(45) Date of Patent: Jul. 19, 2016

(54) DELIVERY SYSTEM FOR DRINKS

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

(21) Appl. No.: 14/450,113

(22) Filed: Aug. 1, 2014

(65) Prior Publication Data

US 2015/0351444 A1    Dec. 10, 2015

Related U.S. Application Data

(60) Provisional application No. 62/009,107, filed on Jun. 6, 2014.

(51) Int. Cl.
  *A23L 2/66* (2006.01)
  *A23L 2/395* (2006.01)
  *A23L 2/52* (2006.01)

(52) U.S. Cl.
  CPC . *A23L 2/395* (2013.01); *A23L 2/52* (2013.01); *A23L 2/66* (2013.01); *A23V 2002/00* (2013.01)

(58) Field of Classification Search
  CPC .............................................. A23V 2250/5432
  USPC .................. 426/2, 89, 519, 577, 648, 590
  See application file for complete search history.

(56) References Cited

U.S. PATENT DOCUMENTS

| | | | |
|---|---|---|---|
| 2,199,406 A | 5/1940 | Jablon |
| 2,311,923 A | 2/1943 | Lautmann |
| 2,370,931 A | 3/1945 | Bogin |
| 2,819,167 A | 7/1958 | Irmscher |
| 3,607,299 A | 9/1971 | Bolt |
| 3,796,813 A | 3/1974 | Kurland |
| 4,076,846 A | 2/1978 | Nakatsuka et al. |
| 4,271,142 A | 6/1981 | Puglia et al. |
| 4,315,513 A | 2/1982 | Nawash et al. |
| 4,393,873 A | 7/1983 | Nawash et al. |
| 4,529,569 A | 7/1985 | Palau |
| 4,551,329 A | 11/1985 | Harris et al. |
| 4,563,161 A | 1/1986 | Zimmerman |
| 4,605,123 A | 8/1986 | Goodrum et al. |
| 4,609,556 A | 9/1986 | Goedert |
| 4,671,953 A | 6/1987 | Stanley et al. |
| 4,711,784 A | 12/1987 | Yang |

(Continued)

FOREIGN PATENT DOCUMENTS

| | | |
|---|---|---|
| CA | 2182907 | 2/1998 |
| CN | 2055129 | 3/1990 |

(Continued)

OTHER PUBLICATIONS

MonoSol A Kuraray Company, http://www.monosol.com/index.php.

(Continued)

*Primary Examiner* — Helen F Heggestad
(74) *Attorney, Agent, or Firm* — Stetina Brunda Garred & Brucker

(57) ABSTRACT

A water soluble shell or binder is used to encapsulate nutrients, flavoring, other food grade ingredients or combinations thereof together as a single serving or unit. The unit or single serving may be distributed to people to provide nutrition to people in mass casualty situations. In this manner, more nutrients may be delivered since water which has a significant amount of weight and volume need not be transported to the people. Moreover, in normal situations, the water soluble shell or binder dissolves sufficiently quick so that the user can quickly consume nutrients.

9 Claims, 8 Drawing Sheets

(56) References Cited

U.S. PATENT DOCUMENTS

| | | |
|---|---|---|
| 4,749,575 A | 6/1988 | Rotman |
| 4,804,542 A | 2/1989 | Fischer et al. |
| 4,841,712 A | 6/1989 | Roou |
| 4,842,157 A | 6/1989 | Stone-Parker et al. |
| 4,851,252 A | 7/1989 | Greither et al. |
| 4,851,339 A | 7/1989 | Hills |
| 4,853,235 A | 8/1989 | Tomomatsu |
| 4,863,737 A | 9/1989 | Stanley et al. |
| 4,881,915 A | 11/1989 | Liaw |
| 4,959,947 A | 10/1990 | Reif |
| 4,988,019 A | 1/1991 | Dawes |
| 5,009,518 A | 4/1991 | Faltynek |
| 5,009,819 A | 4/1991 | Popescu et al. |
| 5,019,405 A | 5/1991 | Sapers |
| 5,024,824 A | 6/1991 | Henk |
| 5,024,842 A | 6/1991 | Edgren et al. |
| 5,035,515 A | 7/1991 | Crossman et al. |
| 5,051,261 A | 9/1991 | McGinity et al. |
| 5,051,269 A | 9/1991 | Noreille et al. |
| 5,085,634 A | 2/1992 | Lackney |
| 5,089,307 A | 2/1992 | Ninomiya et al. |
| 5,119,940 A | 6/1992 | Grindrod |
| 5,127,743 A | 7/1992 | Miller et al. |
| 5,284,667 A | 2/1994 | Zimmermann et al. |
| 5,294,458 A | 3/1994 | Fujimori |
| 5,366,741 A | 11/1994 | Van Der Zon |
| 5,447,730 A | 9/1995 | Greenleaf |
| 5,542,570 A | 8/1996 | Nottingham et al. |
| 5,543,164 A | 8/1996 | Krochta et al. |
| 5,549,757 A | 8/1996 | Morano |
| 5,550,113 A | 8/1996 | Mann |
| 5,554,400 A | 9/1996 | Stipp |
| 5,567,424 A | 10/1996 | Hastings |
| 5,578,304 A | 11/1996 | Sipos |
| 5,578,336 A | 11/1996 | Monte |
| 5,580,408 A | 12/1996 | Vernon et al. |
| 5,601,716 A | 2/1997 | Heinrich et al. |
| 5,613,601 A | 3/1997 | Boulanger et al. |
| 5,616,355 A | 4/1997 | Haast et al. |
| 5,620,724 A | 4/1997 | Adler |
| 5,626,896 A | 5/1997 | Moore et al. |
| 5,633,027 A | 5/1997 | Cherukuri et al. |
| 5,653,996 A | 8/1997 | Hsu |
| 5,657,712 A | 8/1997 | Romagnoli |
| 5,674,544 A | 10/1997 | Shakspeare |
| 5,676,988 A | 10/1997 | Coleman et al. |
| 5,683,997 A | 11/1997 | Buhlmayer et al. |
| 5,690,535 A | 11/1997 | Coleman et al. |
| 5,716,688 A | 2/1998 | Burke et al. |
| 5,716,976 A | 2/1998 | Bernstein |
| 5,721,345 A | 2/1998 | Roberfroid |
| 5,728,681 A | 3/1998 | Kido et al. |
| 5,741,491 A | 4/1998 | Jones |
| 5,768,142 A | 6/1998 | Jacobs |
| 5,772,017 A | 6/1998 | Kang |
| 5,776,524 A | 7/1998 | Reinhart |
| 5,792,754 A | 8/1998 | Green |
| 5,820,437 A | 10/1998 | Coleman et al. |
| 5,820,867 A | 10/1998 | Bewicke |
| 5,849,324 A | 12/1998 | Dohnalek et al. |
| 5,851,578 A | 12/1998 | Gandhi |
| 5,852,917 A | 12/1998 | Romagnoli |
| 5,862,997 A | 1/1999 | Reinke |
| 5,866,188 A | 2/1999 | Battist et al. |
| 5,869,059 A | 2/1999 | Garza |
| 5,885,640 A | 3/1999 | Andersson |
| 5,888,514 A | 3/1999 | Weisman |
| 5,891,465 A | 4/1999 | Keller et al. |
| 5,897,022 A | 4/1999 | Mann |
| 5,910,247 A | 6/1999 | Outterside |
| 5,921,955 A | 7/1999 | Mazer |
| 5,922,350 A | 7/1999 | Janoff et al. |
| 5,927,052 A | 7/1999 | Nippes et al. |
| 5,928,664 A | 7/1999 | Yang et al. |
| 5,951,452 A | 9/1999 | Stevenson |
| 5,962,053 A | 10/1999 | Merritt, II |
| 5,965,162 A | 10/1999 | Fuisz et al. |
| 5,965,185 A | 10/1999 | Bianco |
| 5,968,569 A | 10/1999 | Cavadini et al. |
| 5,972,415 A | 10/1999 | Brassart et al. |
| 5,981,498 A | 11/1999 | Fukuda et al. |
| 5,989,602 A | 11/1999 | Drury et al. |
| 5,993,880 A | 11/1999 | Frost et al. |
| 6,007,838 A | 12/1999 | Alving et al. |
| 6,008,252 A | 12/1999 | Beale |
| 6,008,253 A | 12/1999 | Meglasson |
| 6,022,576 A | 2/2000 | Cirigliano et al. |
| 6,025,363 A | 2/2000 | Giles, Jr. |
| 6,039,952 A | 3/2000 | Sunvold et al. |
| 6,071,539 A | 6/2000 | Robinson et al. |
| 6,083,582 A | 7/2000 | Chen et al. |
| 6,102,224 A | 8/2000 | Sun et al. |
| 6,123,221 A | 9/2000 | Simpson |
| 6,129,265 A | 10/2000 | Perryman et al. |
| 6,133,323 A | 10/2000 | Hayek |
| 6,165,495 A | 12/2000 | Blankenship |
| 6,168,795 B1 | 1/2001 | Djang |
| 6,174,554 B1 | 1/2001 | So |
| 6,180,099 B1 | 1/2001 | Paul |
| 6,180,131 B1 | 1/2001 | Sunvold et al. |
| 6,182,861 B1 | 2/2001 | Kovens et al. |
| 6,190,591 B1 | 2/2001 | van Lengerich |
| 6,191,161 B1 | 2/2001 | Ka'nai et al. |
| 6,204,291 B1 | 3/2001 | Sunvold et al. |
| 6,207,638 B1 | 3/2001 | Portman |
| 6,212,959 B1 | 4/2001 | Perkins |
| 6,214,390 B1 | 4/2001 | Weinstein et al. |
| 6,214,788 B1 | 4/2001 | Velazco et al. |
| 6,217,931 B1 | 4/2001 | Meister |
| 6,221,832 B1 | 4/2001 | Casteel et al. |
| 6,224,873 B1 | 5/2001 | Jones |
| 6,224,922 B1 | 5/2001 | Fonte |
| 6,225,341 B1 | 5/2001 | Bischofberger et al. |
| 6,235,323 B1 | 5/2001 | Carns et al. |
| 6,248,375 B1 | 6/2001 | Gilles et al. |
| 6,248,390 B1 | 6/2001 | Stillman |
| 6,251,450 B1 | 6/2001 | Giacoman |
| 6,255,341 B1 | 7/2001 | DeMichele et al. |
| 6,258,870 B1 | 7/2001 | Hubbell et al. |
| 6,261,589 B1 | 7/2001 | Pearson et al. |
| 6,261,610 B1 | 7/2001 | Sher et al. |
| 6,263,923 B1 | 7/2001 | Castillo |
| 6,264,997 B1 | 7/2001 | Yamakoshi et al. |
| 6,265,450 B1 | 7/2001 | Asami et al. |
| 6,268,011 B1 | 7/2001 | Hoie |
| 6,279,505 B1 | 8/2001 | Plester et al. |
| 6,280,075 B1 | 8/2001 | Cadeo |
| 6,495,190 B1 | 12/2002 | Yaginuma et al. |
| 6,503,582 B1 | 1/2003 | Nardoza et al. |
| 6,596,298 B2 | 7/2003 | Leung et al. |
| 6,733,804 B1 | 5/2004 | Lohrey et al. |
| 6,923,981 B2 | 8/2005 | Leung et al. |
| 7,229,654 B2 | 6/2007 | Gaonkar et al. |
| 7,407,669 B2 | 8/2008 | Leung et al. |
| 7,491,406 B2 | 2/2009 | Leung et al. |
| 7,612,048 B2 | 11/2009 | Pinna et al. |
| 7,648,712 B2 | 1/2010 | Bess et al. |
| 7,678,397 B2 | 3/2010 | MacQuarrie |
| 7,867,509 B2 | 1/2011 | Leung et al. |
| 8,642,051 B2 * | 2/2014 | Stillman ................ 424/400 |
| 2001/0012525 A1 | 8/2001 | Mann |
| 2003/0224090 A1 * | 12/2003 | Pearce et al. ............. 426/89 |
| 2005/0095951 A1 | 5/2005 | Kempton |
| 2005/0106266 A1 * | 5/2005 | Levinson et al. .......... 424/682 |
| 2006/0210610 A1 * | 9/2006 | Davidson et al. .......... 424/439 |
| 2008/0292541 A1 * | 11/2008 | Kamada et al. ............ 423/657 |
| 2014/0093609 A1 * | 4/2014 | Roy ....................... A23L 1/09 426/2 |

FOREIGN PATENT DOCUMENTS

| | | |
|---|---|---|
| DE | 1045314 | 11/1958 |
| DE | 4001500 | 7/1991 |
| DE | 29616646 | 1/1997 |

(56) References Cited

FOREIGN PATENT DOCUMENTS

| DE | 19842526 | 3/2000 |
|---|---|---|
| EP | 0448325 | 9/1991 |
| FR | 2671332 | 7/1992 |
| FR | 2786303 | 5/2000 |
| WO | 9425011 | 11/1994 |
| WO | 9935190 | 7/1999 |
| WO | 2014110356 | 7/2014 |

OTHER PUBLICATIONS

Vivos Edible Delivery Systems, Water Soluble Edible Film, http://www.vivosfilm.com.
Tsukioka Film Pharma Co., Ltd., http://edible-film.com/index.html.
Watson, Edible Films, http://www.watson-inc.com/film_edible.php.
Cure, http://curepharmaceutical.com/index.html.
Ascona Foods Group LTD Food Ingredients and Technology, http://asconafoods.com/products/.
MonoSol A Kuraray Company, The Disappearing Laundry Bag, http://monosol.com/brands.php?p=19.
MonoSol A Kuraray Company, Vivos Edible Delivery System, http://monosol.com/brands.php?p=117.
Vivos Edible Delivery Systems, Instant Food and Beverage Formulations, http://www.vivosfilm.com/instant-food-and-beverage.html.
MonoSol A Kuraray Company. http://www.monosol.com/index.php, published as early as Oct. 3. 2014.
Vivos Edible Delivery Systems, Water Soluble Edible Film, http://www.vivosfilm.com, published as early as Oct. 3, 2014.
Tsukloka Film Pharma Co., Ltd., http://edible-film.com/index.html, published as early as Oct. 3, 2014.
Watson, edible films, http://www.watson-inc.com/film_edible.php. published as early as Oct. 3, 2014.
Cure, http://curepharmaceutical.com/index.html, published as early as Oct. 3, 2014.
Ascona Foods Group LTD Food Ingredients and Technology, http://asconafoods.com/products/, published as early as Oct. 3, 2014.
MonoSol A Kuraray Company, The Disappearing Laundry Bag, http://monosol.com/brands.php?p=19, published early as Oct. 2, 2014.
MonSol A Kuraray Company, Vivos Edidble Delivery System, http://monosol.com/brands.php?p=117, published as early as Oct. 2, 2014.
Vivos Edible Delivery Systems, Instant Food and Beverage Formulations, http://www.vivosfilm.com/instant-food-and-beverage.html, published as early as October 2, 2014.
Dictionary.com, Infusion, http://dictionary.reference.com/browse/infusion, Retrieved May 18, 2015.

* cited by examiner

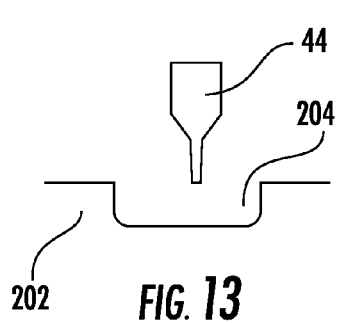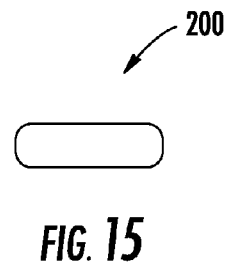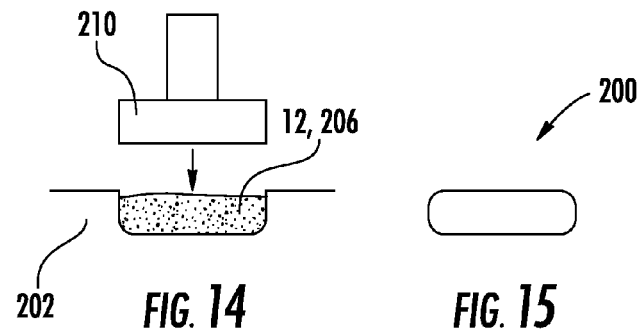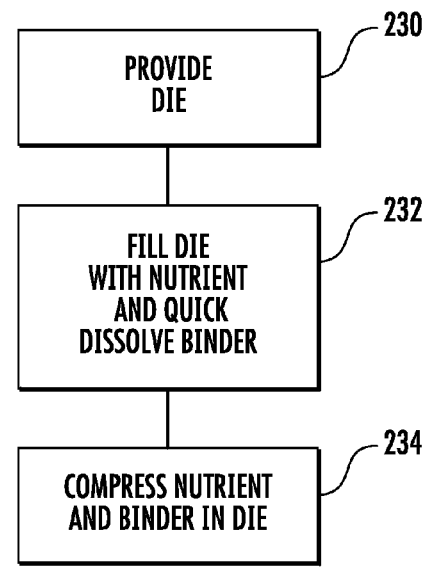

DELIVERY SYSTEM FOR DRINKS

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various embodiments and aspects described herein relate to a method and apparatus for distribution of nutrition.

In order to distribute nutrition to a population, the nutrition is preferably distributed in a self-contained package with water. Alternatively, the base nutritional element may be delivered to the population without water. For example, weight lifters may consume protein by mixing a protein powder in water. The protein powder is distributed and sold to weight lifters while water is locally acquired and mixed with the protein powder as desired by the weight lifter at the time of consumption. Unfortunately, the protein powder is delivered in a large bucket and is cumbersome for the weight lifter to manage. There are also other deficiencies in the prior art.

Accordingly, there is a need in the art for an improved method and apparatus for the delivery of nutrition.

BRIEF SUMMARY

A nutrition delivery apparatus that contains nutrition and may be quickly dissolved and mixed in water is disclosed. The nutrition may be encapsulated with a wrapper (e.g., gelatin capsule or film) or a binder in the form of a tablet. The nutrition may also be impregnated within a structure having a flat film configuration, rope configuration, mesh confirmation, finned configuration, honeycomb configuration or combinations thereof. The film, roll, mesh configured delivery apparatus may be bendable so that it can be rolled up for transportation and storage. The wrapper, binder and the impregnated structure (e.g., flat film, rope, mesh, honeycomb or combinations of these configurations) may dissolve in water fairly quickly so that the nutrition is mixed with water quickly. Moreover, the wrapper, binder and the pre-impregnated structure may be inserted into a water bottle at a later date at the time of consumption or any other container designed to hold, mix or contain water liquid.

More particularly, in an aspect, a delivery device for nutritional supplements is disclosed. The device may comprise a nutrient and a water dissolvable shell. The nutrient may be provided as a powder. The water dissolvable shell is used to hold the powdered nutrient for convenient mixing of the powdered nutrient in water when desired. The water dissolvable shell may be fabricated from a material which sufficiently dissolves in water under one (1) minute for mixing of the powdered nutrient with the water in a quick and efficient manner.

The nutrient may be a protein, vitamin, mineral, proprietary nutritional supplement formulation, meal replacement, food product, drink sweetener, caffeine or combinations thereof. An effervescent material may be mixed with the powdered nutrient to promote mixing of the powdered nutrient with the water as the shell dissolves in water.

The water dissolvable shell may be fabricated from a gelatin material. However, it is also contemplated that the material from which the water dissolvable shell is fabricated may alternatively be a natural, water soluble material including but not limited to rice paper, tapioca powder, Amylose, Amylopectin, Silk (Fibroin) Gelatin, Casein, Pullulan, Guar gum, Soybean polysaccharide film, Agar-agar, Arabinoxylan, Alginate sodium, Callaneenan film, Pectin, HPC film, HPMC film Carboxymethyl, Cellulose film or combinations thereof. The shell may be provided in the form of a semi hard shell, soft capsule or flexible film.

The water dissolvable shell may be sufficiently narrow to be slipped through a mouth of a disposable water bottle. In particular, a width of the shell may be less than about two (2) inch in diameter. However, it is also contemplated that the width of the device may be less than about one (1) inch in diameter.

In another embodiment, a delivery device for nutritional supplements is disclosed. The device may comprise a nutrient and a water dissolvable binder. The nutrient may be provided as a powder. The water dissolvable binder may be used to hold the powdered nutrient in a solid form for convenient mixing of the powdered nutrient in water. The water dissolvable binder may be dissolved in water under one (1) minute for mixing of the powdered nutrient with the water.

The nutrient may be protein, vitamin, mineral, proprietary nutritional supplement formulation, meal replacement, food product, drink sweetener, caffeine or combinations thereof. An effervescent material may be mixed with the powdered nutrient to promote mixing of the powdered nutrient with the water as the binder dissolves in water.

The device may be sufficiently narrow to be slipped through a mouth of a disposable water bottle. In particular, a width of the device may be less than about two (2) inch in diameter. However, it is also contemplated that the width of the device may be less than about one (1) inch in diameter.

In another aspect, a method of manufacturing a delivery device for conveniently mixing a nutrient with water is disclosed. The method may comprise the steps of providing a water dissolvable shell that is sufficiently dissolvable in water under one (1) minute so that water comes into contact with contents disposed within the shell; providing the nutrient as a powder; filling the powdered nutrient in the water dissolvable shell; sealing the water dissolvable shell for holding the powdered nutrient until use when a user disposes the delivery device into a container with water, shakes the container to mix the powdered nutrient as the shell dissolves in the water.

The providing step may include the step of providing a gelatin based water dissolvable shell. Alternatively or additionally, the providing step may include the step of providing a micro film based water dissolvable shell.

In another aspect, a method of manufacturing a delivery device for conveniently mixing a nutrient with water is disclosed. The method may comprise the steps of providing a water dissolvable binder that is sufficiently dissolvable in water under one (1) minute; providing the nutrient as a powder; mixing the binder and the powdered nutrient; filling a die with the mixed binder and powdered nutrient; and compressing the mixed binder and powered nutrient.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 13 illustrates a first step of providing an empty die for filling the nutrition therein with a nozzle;

FIG. 14 illustrates a second step of introducing the nutrition and a binder in the die;

FIG. 15 illustrates a third step of compressing the nutrition and the binder for forming a tablet;

FIG. 16 is a flow chart illustrating a method for manufacturing the third embodiment of the nutrition delivery apparatus;

DETAILED DESCRIPTION

Figure 1:
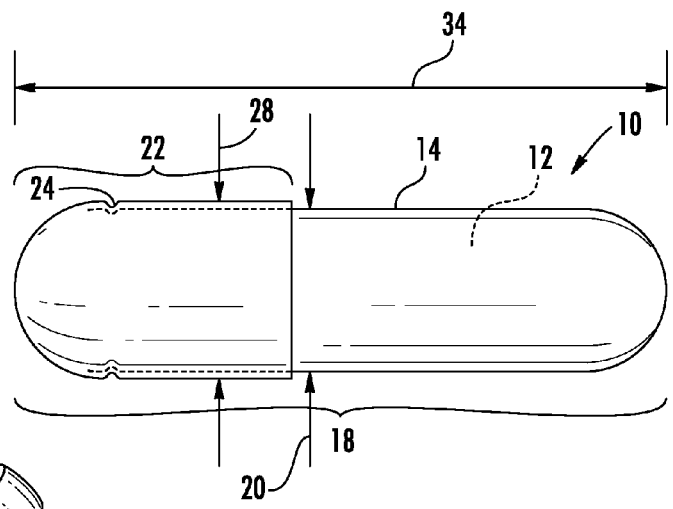
FIG. 1 is a front view of a first embodiment of a nutrition delivery apparatus.
Figures 2, 3:
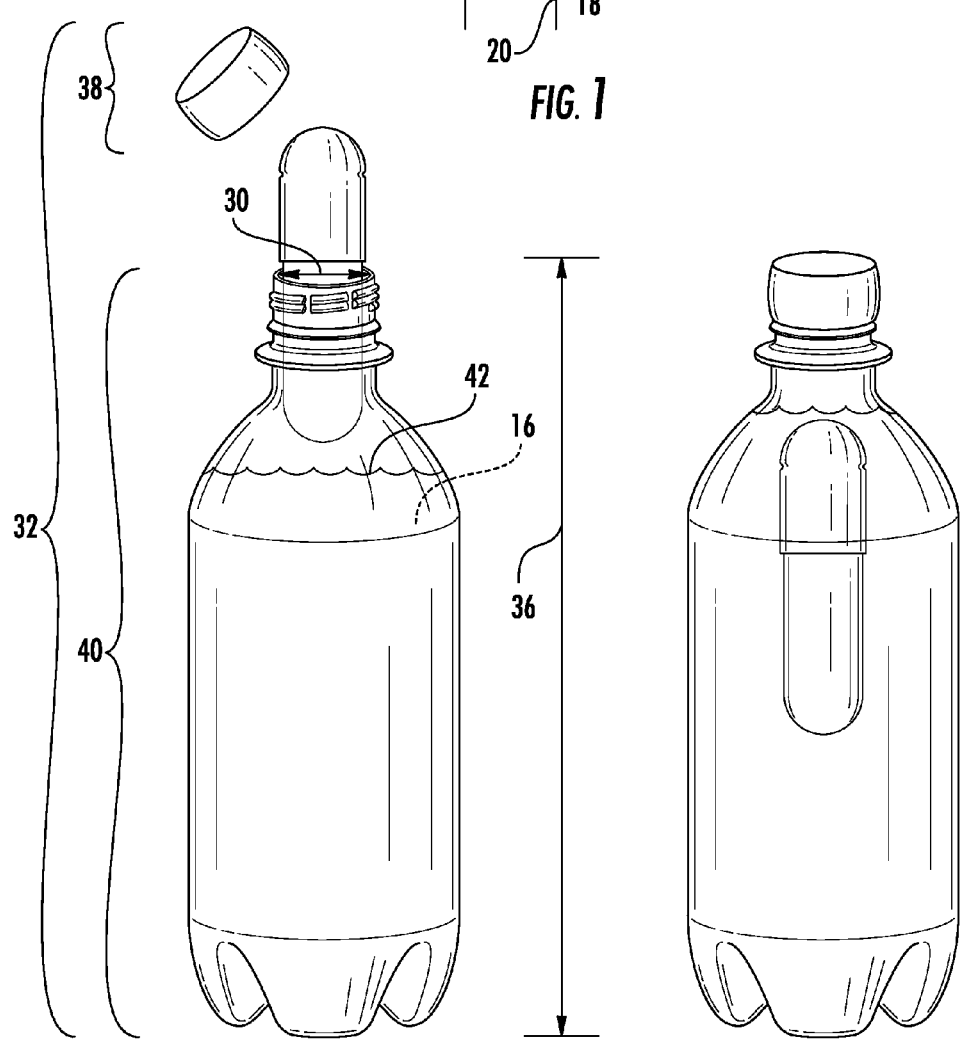
FIG. 2 illustrates the nutrition delivery apparatus of FIG. 1 being inserted into a water bottle.
FIG. 3 illustrates the nutrition delivery apparatus of FIG. 2 as a water soluble wrapper of the nutrition delivery apparatus dissolves to enable mixing of the nutrition in the apparatus to mix with the water.
Figure 4:
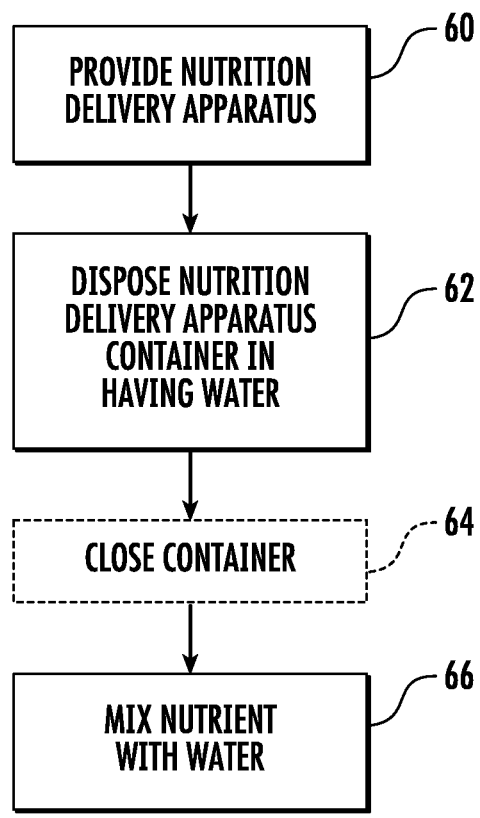
FIG. 4 is a flow chart illustrating use of the nutritional delivery apparatus.
Figure 5:
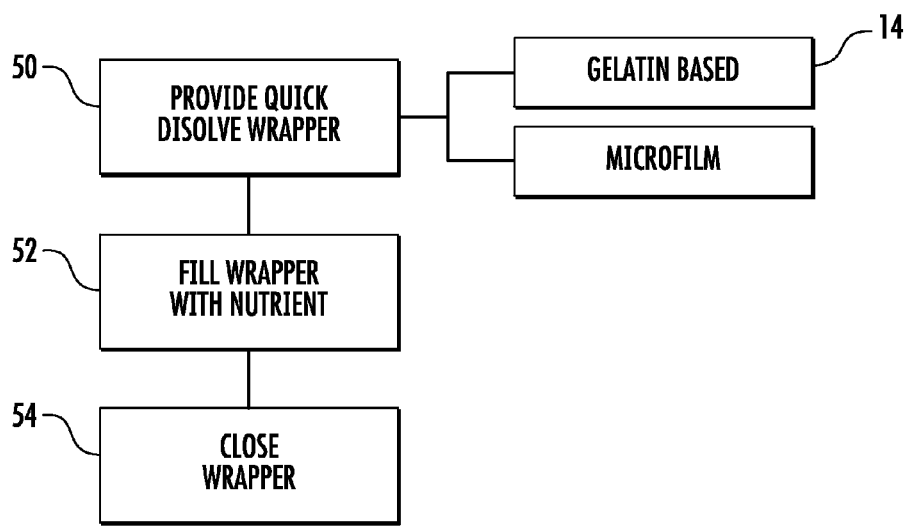
FIG. 5 is a flow chart illustrating a method for manufacturing first and second embodiments of the nutrition delivery apparatus.
Figures 6, 7, 8:
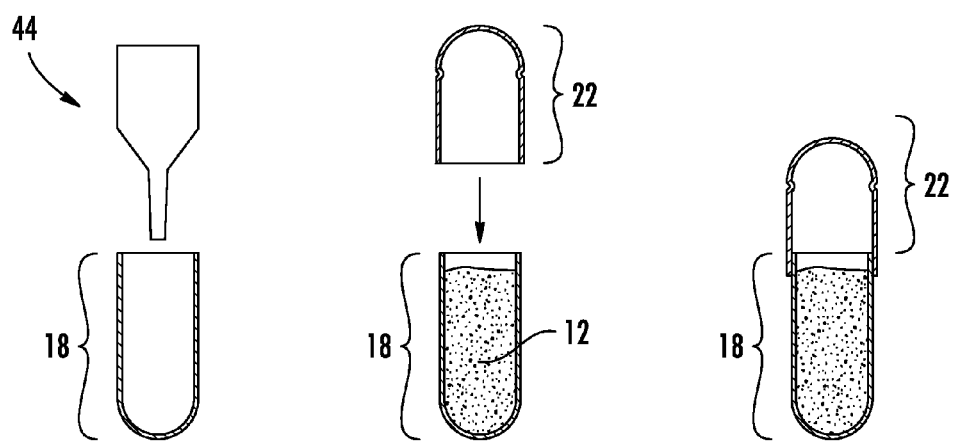
FIG. 6 illustrates a first step of providing an empty first body for filling the nutrition therein with a nozzle.
FIG. 7 illustrates a second step of introducing the nutrition in the first body.
FIG. 8 illustrates a third step of closing the first body with a second body for forming a capsule.

Referring now to the drawings, a method and apparatus 10, 100, 200, 300 for delivering nutrition 12 to a person is shown. In particular, the nutrition 12 is encapsulated within a shell 14, 114 and/or bound together with a binder 214 as a tablet 200. Additionally, the nutrition 12 may be pre-impregnated within a structure (e.g., film or flat sheets, honeycomb, mesh, rope or combinations thereof). The shell 14, 114, the binder 214 and pre-impregnated flexible structure 300 are dissolvable in water 16. Preferably, the shell 14, 114, the binder 214 and the pre-impregnated flexible structure 300 are formulated to dissolve sufficiently quick so that the nutrition 12 can be mixed with the water 16 within one minute. More preferably, the shell 14, 114, the binder 214 and pre-impregnated flexible structure 300 are formulated to dissolve within one minute, and preferably within 10 seconds so that the nutrition 12 may be consumed quickly after deployment. To deliver nutrition 12 to a person, the apparatus 10, 100, 200, 300 provides a small package that can be conveniently delivered to the person. Water which takes up space and is heavy makes delivering the nutrition 12 pre-mixed with water expensive and impractical. The method and apparatus 10, 100, 200, 300 disclosed herein provides practical applications to athletes, delivery of nutrition 12 in mass casualty situations and combat situations, supplementation, and other real-life problems.

The nutrition 12 may consist of proteins, protein formulations, carbohydrates, fats, vitamins, minerals, proprietary nutritional supplement formulation, meal replacement, food product, drink sweetener, caffeine, consumable additives or combinations thereof. However, the nutrition 12 may be replaced with other types of food products. By way of example and not limitation, the food products may be flavoring, coloring. The nutrition 12 may also be combined with the food product and provided in the shell 14, 114 and/or held together with the binder 214. The nutrition 12 or food product may be dissolvable in a liquid 16 (e.g., water) and/or suspended therein. Additionally, it is also contemplated that the nutrition 12 and/or food product may be homogeneously or heterogeneously mixed with the liquid 16. It is also contemplated that the nutrition 12 and/or food product may be partially dissolvable in the liquid 16 so as to form a combination homogeneous and heterogeneous mixture with the liquid 16. For the purposes of clarity and simplification, the methods and apparatuses 10, 100, 200, 300 described herein are discussed in relation to delivering nutrition 12 to a person for subsequent mixture by the person with liquid 16. However, it is also contemplated that the various aspects described herein may be applicable to delivering other food products excluding nutrition 12 or in combination with nutrition 12 to the person for subsequent mixture by the person with liquid 16.

Referring now to FIG. 1, the apparatus 10 for delivering nutrition 12 to a person is shown. The nutrition delivery apparatus 10 has a quick dissolve shell 14 in the form of a capsule 14. The interior and/or exterior surface of the shell 14 may have indicia (e.g., words, logo, design or combinations thereof) imprinted thereon. The capsule 14 may be fabricated from a gelatin material. Alternatively or in combination with the gelatinous material, rice powder, rice paper, tapioca powder may be formulated to be dissolve in water within a short period of time (e.g., less than 1 minute, and more preferably less than 10 seconds). The gelatinous material may be infused with color. Also, the exterior and/or interior surface of the capsule 14 may have indicia (e.g., words, logo, design and/or combinations thereof) imprinted thereon. The capsule 14 may have a hard shell with the nutrition 12 disposed therein. In this case, the nutrition 12 may be in the form of dry granules or powder. Alternatively, the capsule 14 may have a soft shell with the nutrition 12 disposed therein. In this case, the nutrition 12 may be dissolved or suspended in a carrier liquid (e.g., oil). The capsule 14 may be a two-piece hard shell component, as shown in FIG. 1. In particular, a first body 18 may have an outer diameter 20 and be capable of holding the nutrition 12 therein. A second body 22 may have a snug fit over the open end portion of the first body 18. Moreover, the second body 22 may have a lip 24 that fits within a groove 26 formed in the first body 18 for holding the second body 22 on the first body 18. With the nutrition 12 disposed within the capsule 14, the nutrition delivery apparatus 10 may be transported in bulk to stores or mass casualty situations for providing nutrition 12 to people when needed.

The capsule 14 may also have an outer diameter 28 defined by the second body 22. Preferably, the outer diameter 28 of the capsule 14 is smaller than an inner diameter 30 of a water bottle 32. The water bottle 32 may be a traditional disposable water bottle 32 such as those sold by water bottling manufacturers. Additionally, the capsule 14 may have a length 34 that is shorter than an internal height 36 of the water bottle 32. Preferably, the capsule 14 is less than one half the height 36 of the water bottle 32. More preferably, the capsule 14 has an outer diameter 28 of about one (1) to two (2) inches and a length 34 of six (6) to eight (8) inches. The capsule 14 is shown as being spherical at the opposed end portions with an elongate cylindrical mid section. However, other configurations are also contemplated. By way of example and not limitation, the opposed end portions may have a flat end cap.

The nutrition delivery apparatus 10 may be delivered to stores for further distribution to the public or to an area experiencing a natural disaster or pandemic. People may be sustained by the nutrition 12 within the nutrition delivery apparatus 10 by mixing the nutrition delivery apparatus 10 with water locally acquired. In this manner, the volume and weight of the water does not have to be transported with the nutrition.

By way of example and not limitation, people may insert the nutrition delivery apparatus 10 into the water bottle 32. The user may acquire water 16 locally. The nutrition delivery apparatus 10 may be transported to the person when needed such as during time of combat, mass casualty and other pandemics. The user may remove a bottle cap 38 from a body 40 of the water bottle 32. Since a water level 42 is typically close to the top of the body 40, the user may drink some of the water 16 in the water bottle 32 to lower the water level 42. The nutrition delivery apparatus 10 may be inserted 62 into the mouth of the water bottle 32. The nutrition delivery apparatus 10 displaces the water 16 or raises the water level within the water bottle 32. Preferably, the user emptied out the water 16 from the water bottle 32 just enough for the water 16 not to spill over when the nutrition delivery apparatus 10 is inserted into the water bottle 32. Once the nutrition delivery apparatus 10 is inserted into the water bottle 32, the user places 64 the bottle cap 38 on to the body 40 to seal 54 the water 16 and the nutrition delivery apparatus 10 in the body 40 of the water bottle 32.

When the nutrition delivery apparatus 10 is inserted into the body 40, the shell 14 comes into contact with the water 16 disposed in the body 40 of the water bottle 32. Upon contact, the shell 14 begins to dissolve into the water 16 so that the nutrition 12 disposed within the shell 14 begins to mix 66 with the water 16. As the water 16 dissolves the shell 14, the nutrition 12 disposed within the shell 14 begins to mix 66 with the water 16. The user shakes the water bottle 32 to more evenly dispersed the nutrition 12. Once mixed, the user removes the bottle cap 38 from the body 40 then drinks the water 16 mixed with the nutrition 12.

The method and apparatus 10, 100, 200, 300 described herein allow for inexpensive distribution of nutrition 12 by not having to transport water 16 with the nutritional elements.

Referring now to FIGS. 5-8, a method for manufacturing the nutrition delivery apparatus 10 is shown. In particular, the quick dissolve shell 14 is provided 50. The quick dissolve shell 14 is provided in two parts, namely, the first body 18 and a second body 22. Initially, the first body 18 is placed under a nozzle 44 which dispenses the nutrition 12 therethrough. The nozzle 44 disposes 52 the nutrition 12 within the cavity 204 of the first body 18. Thereafter, the second body 22 is disposed over the first body 18 then pressed over the first body 18 to seal 54 the nutrition 12 in the shell 14. This forms the nutrition delivery apparatus 10.

Figure 9:
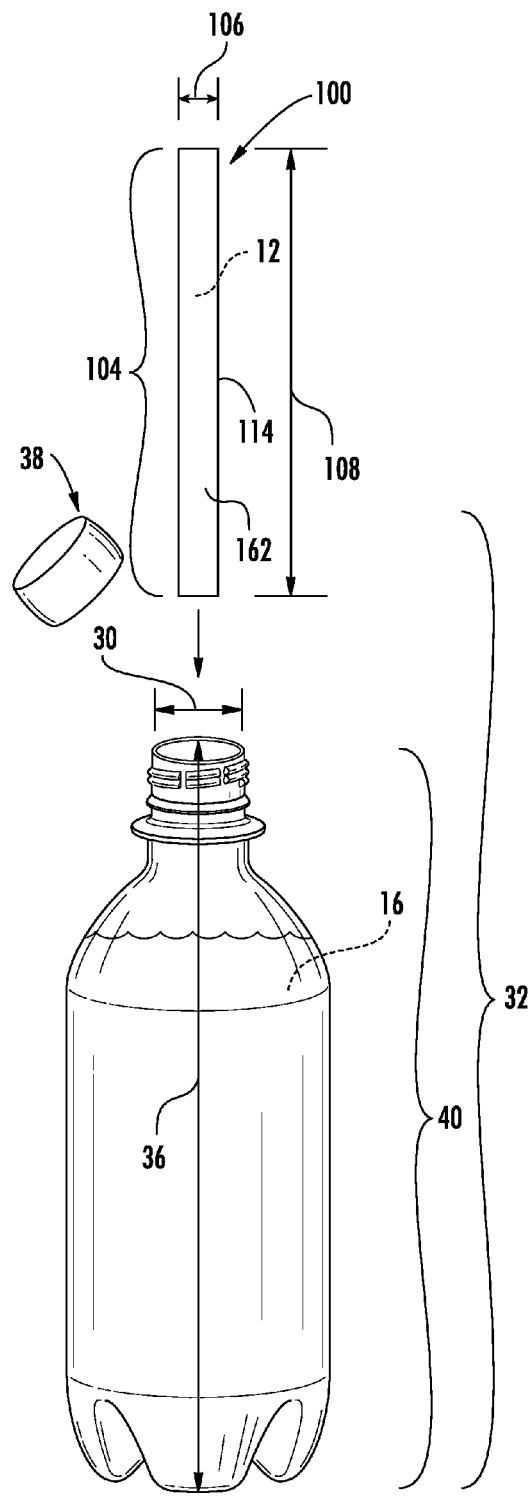
FIG. 9 illustrates a second embodiment of the nutrition delivery apparatus being inserted into the water bottle.
Figure 10:
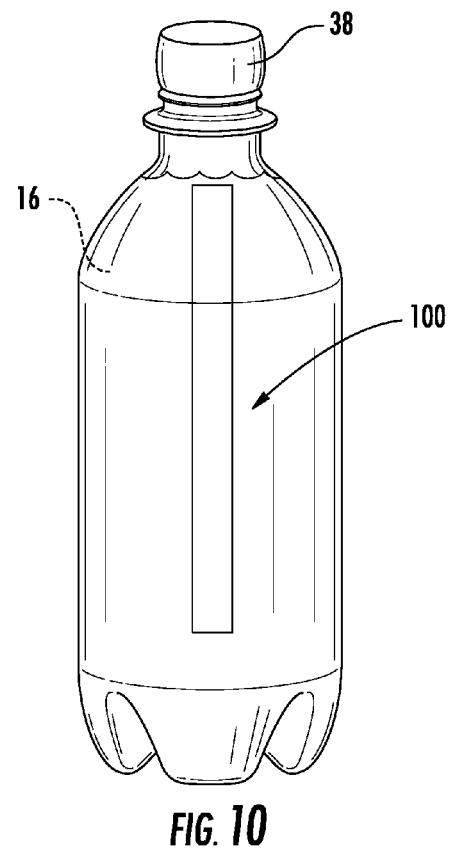
FIG. 10 illustrates the nutrition delivery apparatus of FIG. 9 as a water soluble wrapper of the nutrition delivery apparatus dissolves in water to enable mixing of the nutrition in the apparatus to mix with the water.
Figures 11, 12:
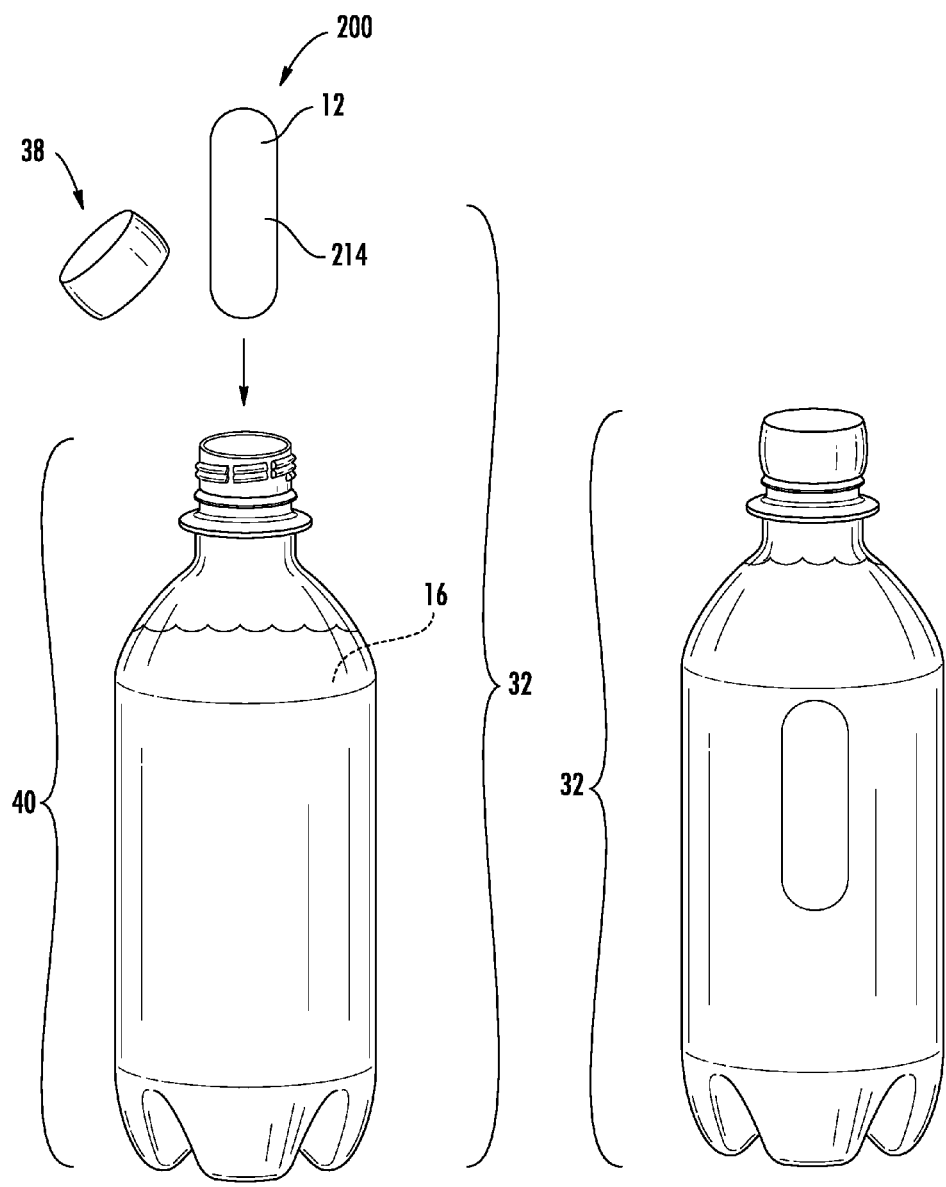
FIG. 11 illustrates a third embodiment of the nutrition delivery apparatus being inserted into the water bottle.
FIG. 12 illustrates the nutrition delivery apparatus of FIG. 11 as a water soluble binder of the nutrition delivery apparatus dissolves in the water to enable mixing of the nutrition in the apparatus to mix with the water.

Referring now to FIGS. 9 and 10, a second embodiment of the nutrition delivery apparatus 100 is shown. In this embodiment, the nutrition 12 is provided as a flexible edible film 102. The film 102 may be a water soluble polymer film. The flexible film 102 is formed as a pouch 104 for holding the nutrition 12 therein. The pouch 104 has a width 106 which is smaller than the inner diameter 30 of the water bottle 32 so that the nutrition delivery apparatus 100 may be inserted (or slipped) into the mouth of the water bottle 32. Moreover, the pouch 104 has a length 108 which is smaller than the height 36 of the water bottle 32. More preferably, the length 108 of the pouch 104 is about one half or less than the height 36 of the water bottle 32.

Similar to the first embodiment, the user removes (i.e., un-screws) the bottle cap 38 off of the body 40 of the water bottle 32. The user may drink a portion of the water 16 in the body 40 to make room for the volume to be displaced by the nutrition delivery apparatus 100. The nutrition delivery apparatus 100 is inserted into the body 40 through the mouth of the body 40. Once the nutrition delivery apparatus 100 is disposed 62 within the body 40, the bottle cap 38 is used to seal 54 off the mouth of the body 40, as shown in FIG. 10. As soon as the nutrition delivery apparatus 100 contacts the water 16, the film 102 begins to dissolve in the water 16 and the nutrition 12 begins to mix 66 with the water 16. The user may shake the water bottle 32 to facilitate further mixing 66 until all of the nutrition 12 is mixed with the water 16. Thereafter, the user may remove the bottle cap 38 and drink the water 16 mixed with nutrition 12.

To manufacture the nutrition delivery apparatus 100, the film 102 is provided as a pouch 104. One end of the pouch 104 is opened so that the nozzle 44 may be disposed over or in the opening for filling the pouch 104 with nutrition 12. After the nutrition 12 is disposed 62 within the pouch 104, the pouch 104 may be sealed 54 for storage and distribution.

Referring now to FIGS. 11-16, a third embodiment of the nutrition delivery apparatus 200 is shown. The nutrition delivery apparatus 200 tablet is formed so that the nutrition 12 is held together with the binder 206. The binder 206 may be sodium bicarbonate, stearic acid and/or magnesium stearate. The binder 206 is water 16 dissolvable. As such, the nutrition delivery apparatus 200 begins to mix 66 the nutrition encapsulated with the binder 206 as soon as the nutrition delivery apparatus 200 is inserted into the water 16 in the water bottle 32. After inserting the nutrition delivery apparatus 200 in the water 16, the bottle cap 38 is used to seal off 54 the mouth of the water bottle 32. The user may shake the water bottle 32 to facilitate mixing 66. When the binder 206 has completely dissolved, the nutrition 12 may be fully mixed 66 with the water 16. The user may remove the bottle cap 38 to drink the water 16 with nutrition 12. Alternatively, the nutrition 12 may be bound together with the binder 206 and an effervescent material 208 to facilitate mixture 66 of the nutrition 12 with the water 16. In this case, the bottle cap 38 is not placed on the body 40 of the water bottle 32. Rather, the bottle cap 38 is left off of the body 40 so that the effervescent material 208 may produce gas and escape into the atmosphere. The nutrition delivery apparatus 200 may be provided in the form of a tablet and be sized and configured to be able to fit within the mouth opening of the body 40. However, it is also contemplated that the bottle cap 38 may be threaded onto the body 40 of the water bottle 32 while allow the effervescent material 208 to facilitate mixture 66 of the nutrition with the water.

Referring now more particularly to FIGS. 13-16, a method of manufacturing the nutrition delivery apparatus 200 is shown. Initially, a die 202 is provided 230. The die 202 may have a cavity 204 which is sized and configured so that the final form of the nutrition delivery apparatus 200 can be inserted into the mouth of the water bottle 32. The nozzle 44 is disposed over the cavity 204 of the die 202. The nozzle 44 is operative to fill 232 the cavity 204 with (1) the nutrition 12 and the binder 206 or (2) the nutrition 12, the binder 206 and an effervescent material 208. Once the nutrition 12 and the binder 206 and/or effervescent material 208 are disposed within the cavity 204 of the die 202, a press 210 compresses 234 the mixture. When the press 210 is removed, the nutrition delivery apparatus 200 is removed from the cavity 204.

Figure 17:
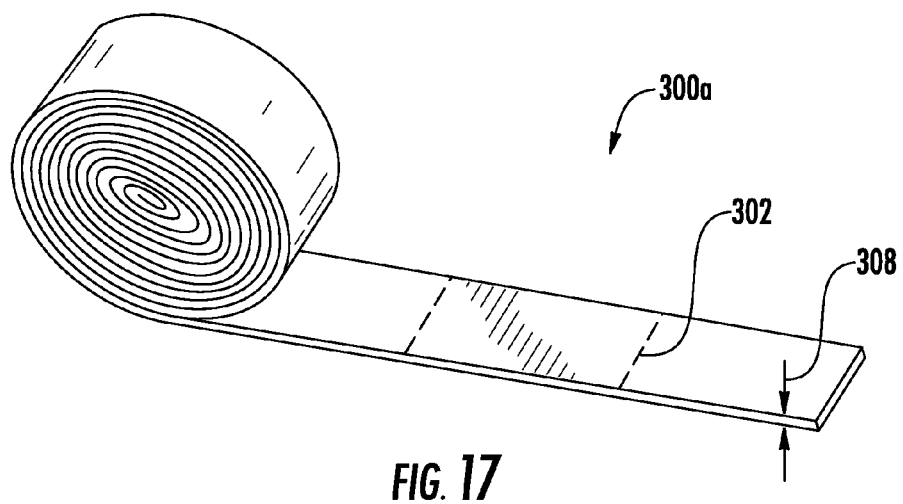
FIG. 17 is a perspective view of a fourth embodiment of the nutrition delivery apparatus having a roll configuration.

Referring now to FIGS. 17-20, a fourth embodiment of the apparatus 300 is disclosed. The apparatus 300 may be a pre-impregnated structure. The pre-impregnated structure may have various configurations such as strip, honeycomb, mesh, rolled rope configurations. The pre-impregnated structures 300 may be rolled or provided for transportation in a stacked fashion. By way of example and not limitation, FIG. 17 illustrates pre-impregnated structure 300a being provided as a rolled strip. In this regard, the strip 300a is flexible in nature so as to be rollable. The rolled strip 300 may be transported to a location for later mixture with water in a standard water bottle or another container useful for mixing the rolled strip 300a into the water. The rolled strip 300a may have pre-printed dosage lines 302 so that the user may cut the strips to appropriate lengths for mixture with an appropriate amount of nutrition 12 and water. By way of example and not limitation, the user may mix X number of strips with 8 fluid ounces of water depending on the size of the person to provide the appropriate amount of nutrition to the person. The preprinted dosage lines 302 may additionally or alternatively be perforations formed in the strip 300a so that the user need not use a pair of scissors to cut the strip but may simply tear the strip at an appropriate perforated dosage line 302.

Figure 18:
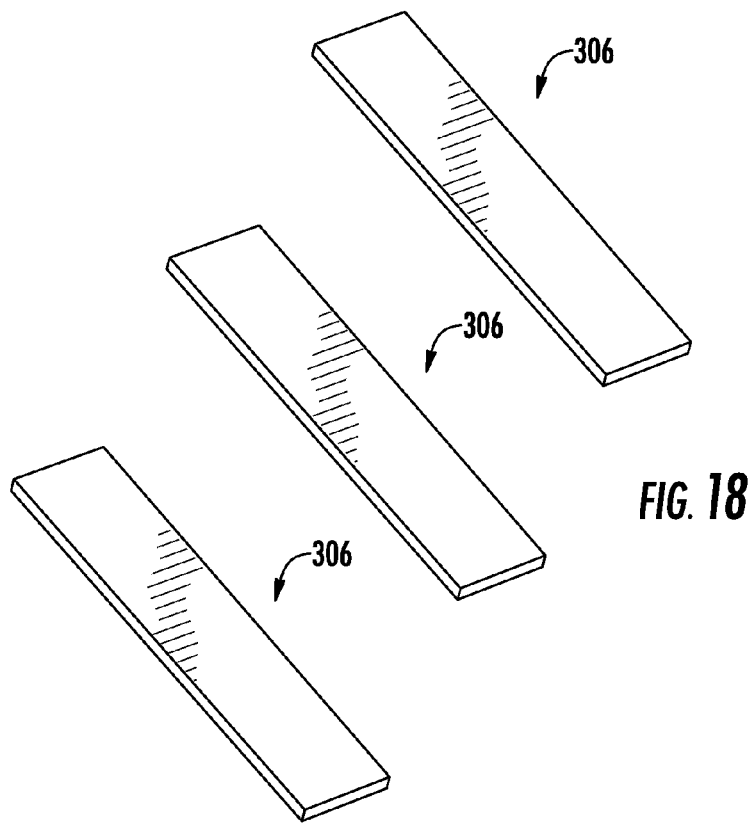
FIG. 18 is a perspective view of the fourth embodiment of the nutrition delivery apparatus having a strip configuration.

Referring now to FIG. 18, the strip 300a may be provided as short strips 306 instead of a long strip which is rolled up. The strip 300a may have a thickness 308 of between 1 mm and 40 mm.

Figure 19:
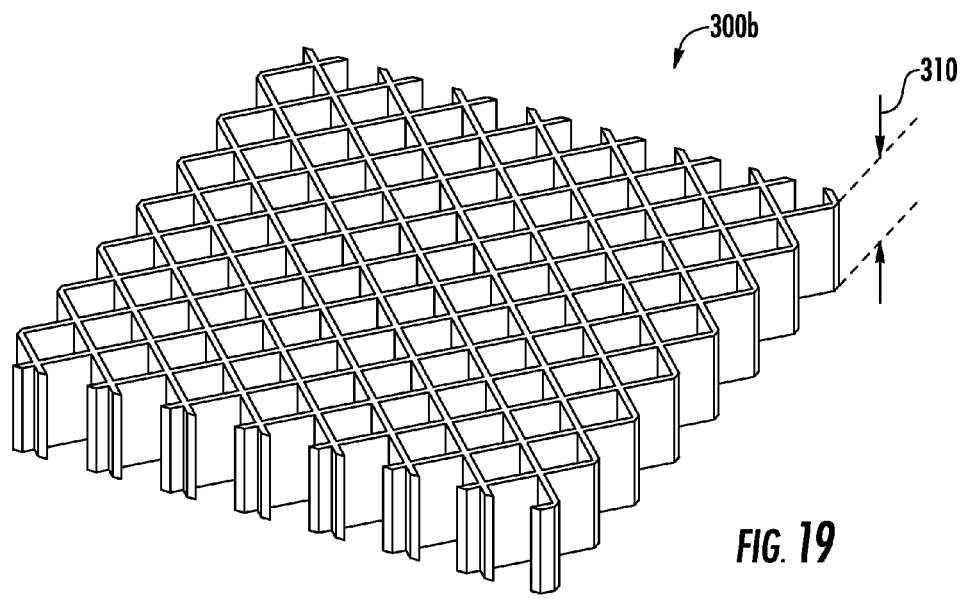
FIG. 19 is a perspective view of the fourth embodiment of the nutrition delivery apparatus having a honeycomb configuration.

Referring now to FIG. 19, a second embodiment of the pre-impregnated structure 300b is shown. The pre-impregnated structure 300b is formed as a honeycomb structure. By forming the pre-impregnated structure into a honeycomb structure, when the apparatus 300b is submersed in water, the honeycomb structure 300b increases the surface area contact between the structure 300b and the water so as to increase the dissolveability and reduce the amount of time required to dissolve the structure 300b in the water and mix the nutrition 12 with the water. The honeycomb structure 300b is shown when flat. However, the honeycomb structure may also be provided in a rolled up form on a spool. It is also contemplated that the honeycomb structure 300b may also be cut to size with a pair of scissors or a utility knife to mix the appropriate amount of nutrition impregnated in the structure 300b with water based on the person's size. The honeycomb structure 300b may have a thickness 310 between 1 mm and 40 mm. Additionally, the honeycomb structure 300 may be provided in other configurations such as mesh or finned structure in order to increase the surface area contact between the water and the structure 300b.

Figure 20:
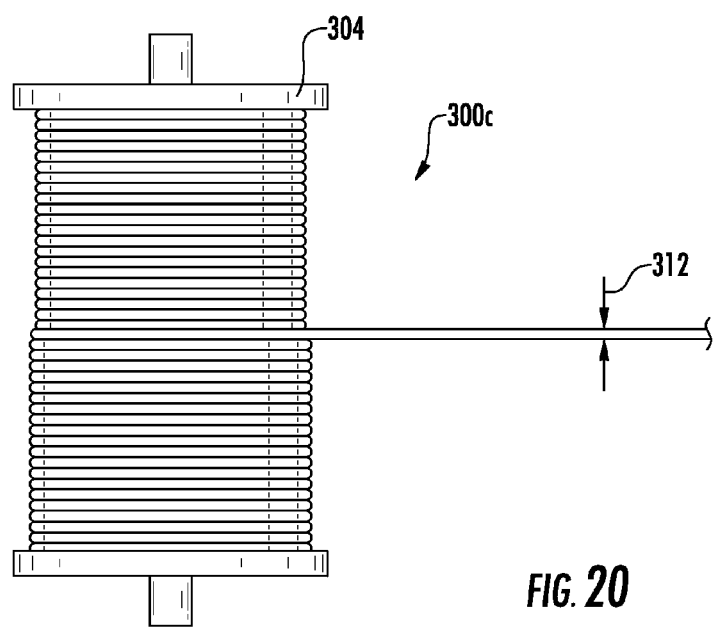
FIG. 20 is a perspective view of the fourth embodiment of the nutrition delivery apparatus having a rope configuration.

Referring now to FIG. 20, a third embodiment of the pre-impregnated structure 300c is shown. The structure 300c is a rope configuration that may be rolled on a spool 304 so that the user can unwind the structure 300c and cut off the appropriate amount of nutrition based on the length of the structure 300c. The rope configuration 300c may have a diameter 312 between 1 mm and 40 mm. Moreover, the rope configuration of the structure 300c may have a single or multiple twine that are twisted with each other and may be cut to length with a scissor or utility knife. By providing multiple twines that are twisted together, such configuration increases the surface area contact between the water and the rope configured pre-impregnated structure 300c to improve dissolveability and to reduce the time to completely dissolve the structure 300c placed in the water.

The various structures 300a-c may be formed by extrusion or molding. The nutrition 12 may be mixed with a binder which is flexible when cured so that the structure 300a-c may be rolled up.

The nutrition delivery apparatus 10, 100, 200, 300 may be manufactured with multiple water dissolving substrates. By way of example and not limitation, the nutrition 12 may be provided as a tablet then disposed within the shell 14, 114. The shells 14, 114 may be layered on top of each other. Either the shell 14 may be layered under the shell 114, or the shell 114 may be layered under shell 14. Also, the shell 14, 114 and the binder 206 may be fabricated from food grade ingredients so that the nutrition delivery apparatus 10, 100, 200 may simply be mixed with water then consumed without filtering out the shell 14, 114 or binder 206 in a post processing step.

The nutrition delivery apparatus 10, 100 may be provided so that it sinks to the bottom of a water bottle after being inserted into the water bottle. The capsule 14 and the pouch 104 may be air tight and vacuumed to remove the air within the capsule 14 and the pouch 104. Additionally, the nutritional delivery apparatus 10, 100, 200 may have a solid non dissolvable core/object or a core/object that dissolve slower than the rest of the nutrients. In this manner, as the water soluable shell 14, film 102 or binder 206 dissolves, the user may shake the water bottle so that the non dissolvable or slowly dissolving core or object is used to mix the nutrition 12 with the water 16.

The various aspects described herein was in relation to a nutrition delivery apparatus that may be slipped into a narrow mouth of a water bottle. However, it is also contemplated that the nutrition delivery apparatus may be inserted into other types of wide mouth containers such as a water cup and a shaker bottle. In this instance, the diameter of the nutrition delivery apparatus may be significantly larger than 2 inches.

The above description is given by way of example, and not limitation. Given the above disclosure, one skilled in the art could devise variations that are within the scope and spirit of the invention disclosed herein, including various ways of distribution of the nutrition delivery apparatus 10, 100, 200 to people. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A combination disposable water bottle and a container, the combination comprising:
   drinkable water;
   the disposable water bottle with the drinkable water disposed within the water bottle, the water bottle having an opening narrower than a body of the disposable water bottle;
   the container comprising:
      an ingestible protein nutrient provided as a powder;
      an ingestible water dissolvable binder for holding the powdered ingestible protein nutrient in a solid form for convenient mixing of the ingestible protein nutrient in drinkable water, the binder being sodium bicarbonate, stearic acid, magnesium stearate or combinations thereof, the solid form being sufficiently narrow to be inserted into an opening of a disposable water bottle, the solid form being about 6 inches in length;

wherein the ingestible water dissolvable binder is dissolved in drinkable water under one (1) minute thereby releasing the protein nutrient in the drinkable water;

wherein the drinkable water dissolvable binder is entirely dissolvable and all contents held together in the solid form is ingestable so that a user ingests the drinkable water and an entirety of the container.

2. The combination of claim 1 further comprising an effervescent material mixed with the powdered ingestible protein nutrient to promote mixing of the powdered ingestible protein nutrient with the drinkable water as the binder dissolves in drinkable water.

3. The combination of claim 1 wherein the ingestible water dissolvable binder is less than about one (1) inch in diameter.

4. The combination of claim 1 wherein the solid form is a film sheet.

5. The combination of claim 1 wherein the solid form has a mesh configuration.

6. The combination of claim 1 wherein the solid form has a honeycomb configuration.

7. The combination of claim 1 wherein the solid form has a rope configuration.

8. The combination of claim 7 wherein the rope configured solid form has multiple twines.

9. A method of manufacturing a container with a formulation for conveniently mixing an ingestible protein nutrient with drinkable water, the method comprising the steps of:

providing an ingestible water dissolvable binder that is sufficiently dissolvable in drinkable water under one (1) minute, the binder being sodium bicarbonate, stearic acid, magnesium stearate or combinations thereof, the ingestible water dissolvable binder providing a solid form when cured, a width of the solid form being sufficiently narrow to be inserted into an opening of a disposable water bottle and a length of the solid form being about 6 inches in length;

providing the ingestible protein nutrient as a powder;

mixing the ingestible water dissolvable binder and the powdered ingestible protein nutrient;

filling a die with the mixed ingestible water dissolvable binder and powdered ingestible protein nutrient;

compressing the mixed ingestible water dissolvable binder and powered ingestible protein nutrient.

* * * * *